Aug. 1, 1939. P. E. STONE 2,168,003
REAR VIEW MIRROR
Filed Dec. 14, 1936 3 Sheets-Sheet 1

INVENTOR.
Porter E. Stone
BY Barnes, Kisselle, Laughlin & Raisch
ATTORNEYS.

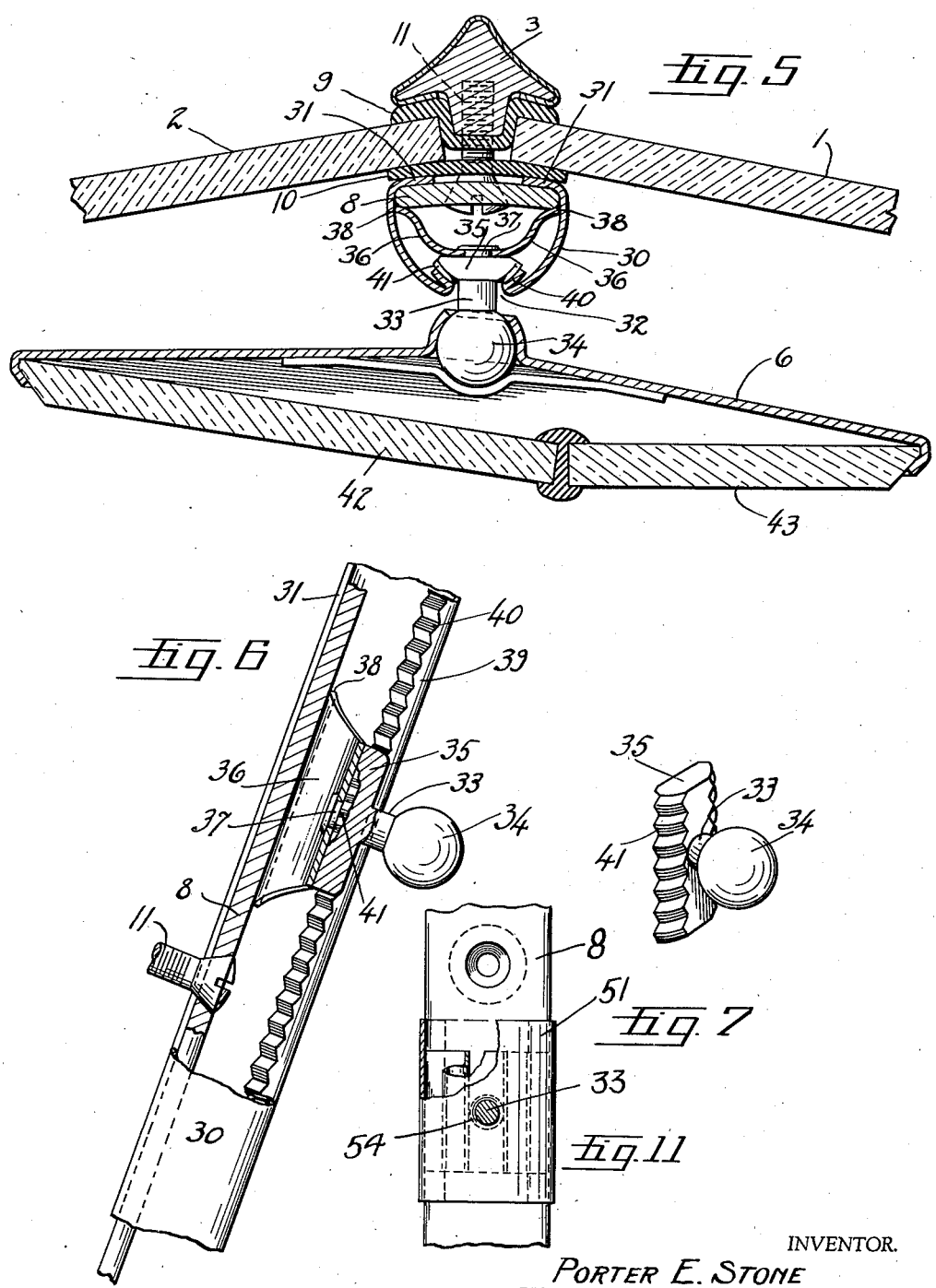

Aug. 1, 1939.  P. E. STONE  2,168,003
REAR VIEW MIRROR
Filed Dec. 14, 1936  3 Sheets-Sheet 3
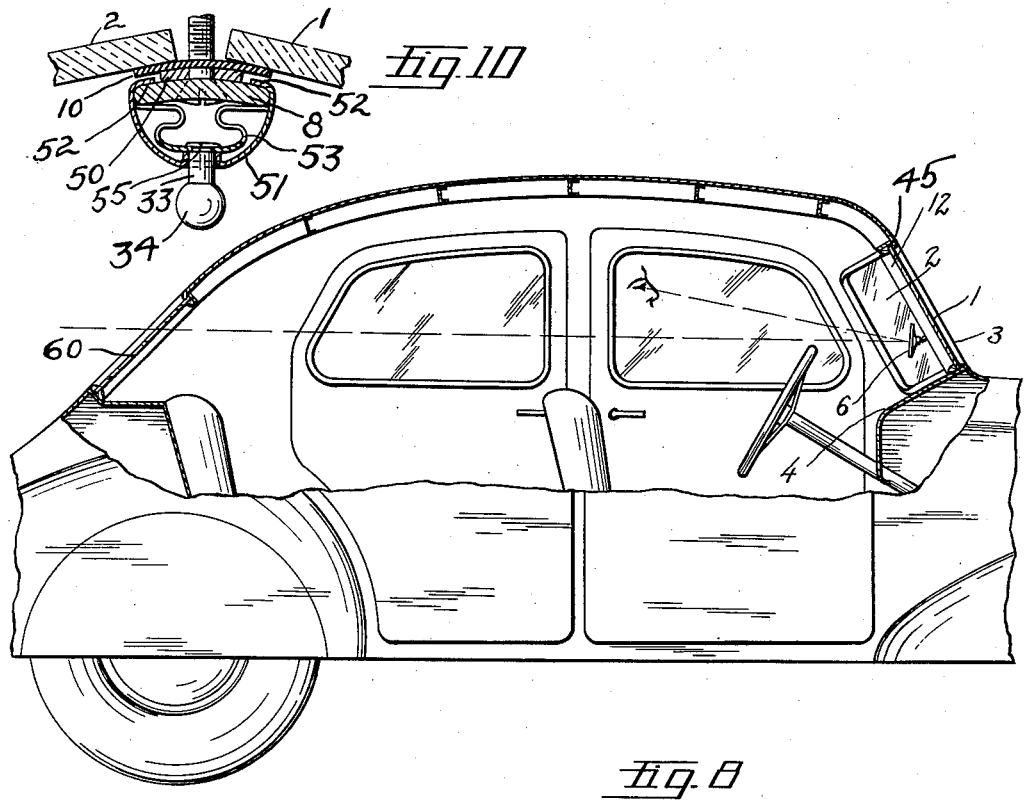
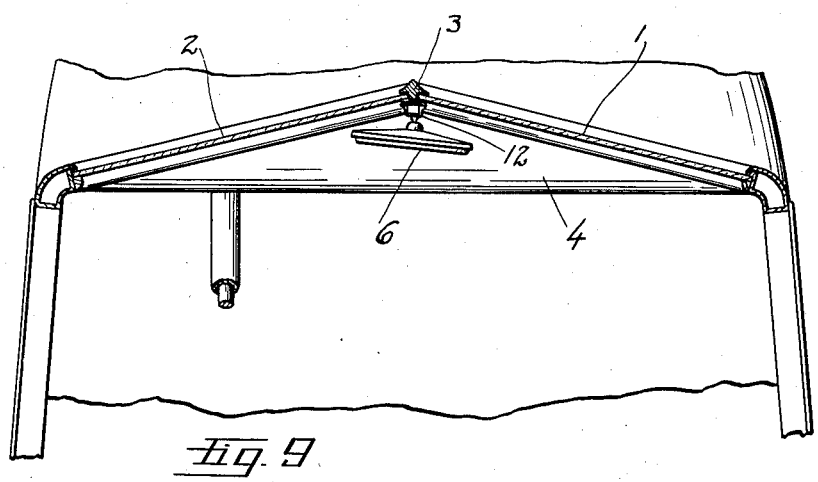
INVENTOR.
PORTER E. STONE
BY Barnes, Kisselle, Laughlin & Raisch
ATTORNEYS.

Patented Aug. 1, 1939

2,168,003

UNITED STATES PATENT OFFICE 2,168,003

REAR VIEW MIRROR

Porter E. Stone, Detroit, Mich.

Application December 14, 1936, Serial No. 115,718

4 Claims. (Cl. 88—93)

This invention relates to a rear view mirror. Rear view mirrors mounted on the windshield header bar above the windshield have long been used in automobiles. However, the present trend toward the streamlined body with the slanting roof in the rear, which necessitates also inclining the rear window glass rearwardly from top to bottom, has considerably decreased the range of vision possible through the rear view mirror mounted on the windshield header.

It is an object of this invention to produce a rear view mirror which will eliminate the above-mentioned defect in the presently used rear view mirror and greatly increase the view obtainable in the rear view mirror in spite of the decreased outlook provided by the inclined rear window. This object has been achieved by adjustably mounting the rear view mirror on the division pillar of the windshield so that it can be raised and lowered to accommodate a tall as well as a short driver and assure him of the greatest range of vision possible through the rear view mirror and rear window opening.

In the modern car the V type of windshield is inclined forwardly from the outside toward the longitudinal center line of the body and the instrument panel projects horizontally and rearwardly from the lower edge of the V-windshield so that the V-windshield glass panels and the instrument panel provide a corner which, owing to forward inclination from top to bottom of the windshield glass panels, places this corner appreciably forwardly of the header bar. Further, the use of the inclined windshield has made the mounting of the rear view mirror on the windshield header bar above the windshield a source of discomfort and annoyance to the average motorist because, particularly in getting into the car, the rear view mirror thus mounted is very often struck by the head or hat of the motorist.

It is an object of this invention to overcome this disadvantage. This object has been achieved by mounting the rear view mirror in the corner provided by the glass panels of the presently used V-windshield. Hence, by mounting the rear view mirror in this corner, preferably on the division pillar of the V-windshield, the mirror is thereby positioned out of the range in which it will be struck by the hat or head or other portion of the body of the driver or front seat passenger.

In the drawings:

Fig. 5 is a horizontal sectional view similar to Fig. 2 through a modified form of support for the mirror.

Fig. 6 is a vertical section through the windshield division pillar and support for the mirror.

Fig. 7 is a detail of one of the clutch members for locking the mirror in adjusted position.

Fig. 8 is a longitudinal section through an automobile body showing the position of the mirror relative to the rear window.

Fig. 9 is a horizontal section through the windshield looking down upon the instrument panel.

Figs. 10 and 11 are sectional and front elevational views respectively of a modified form of adjusting slide arrangement for the mirror.

Figure 1:
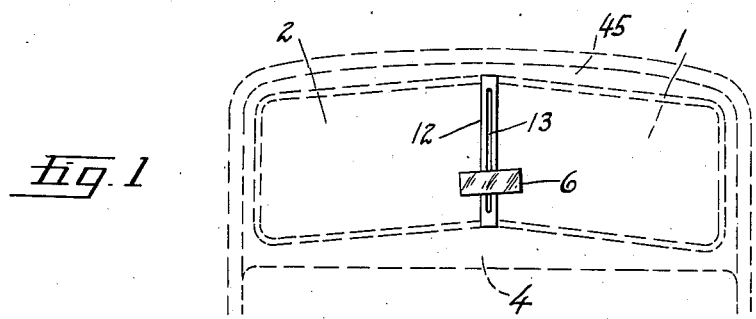
Fig. 1 is an inside view of the windshield showing the mirror in position.
Figure 2:
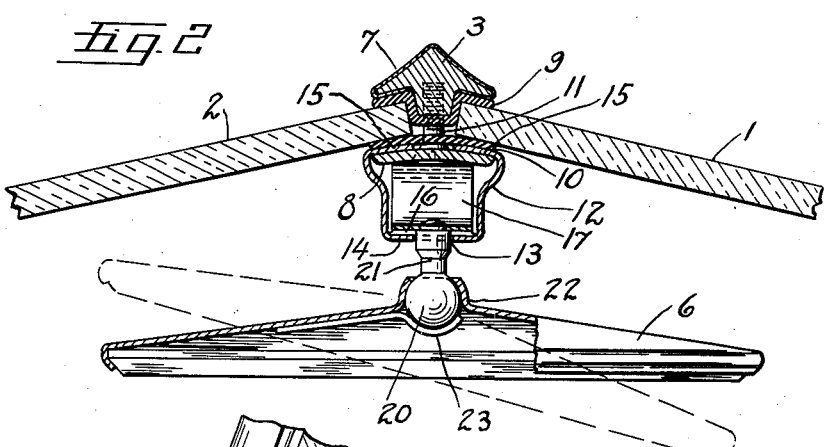
Fig. 2 is a horizontal section through the mirror and windshield.
Figure 3:
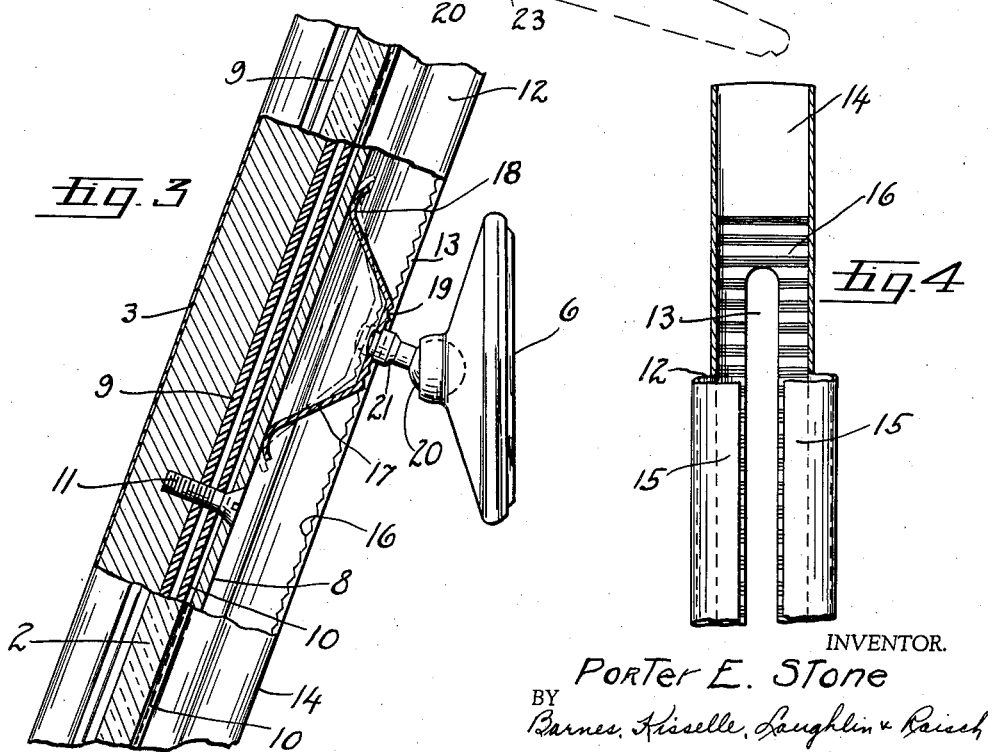
Fig. 3 is a vertical section through the windshield and division pillar and clutch for holding the mirror in position.
Figure 4:
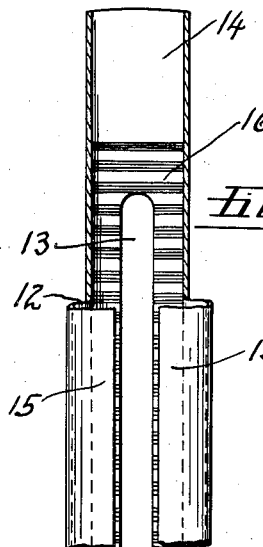
Fig. 4 is a detail of the channel member in which the mirror is guided in its vertical adjustment.

Referring more particularly to the drawings there is shown a V-windshield having the glass panels 1 and 2 which are inclined rearwardly from the vertical division pillar, generally designated 3, outwardly i. e., toward the sides of the automobile body and which are also inclined rearwardly from bottom to top. There is also shown the instrument panel 4 which extends approximately horizontally rearwardly from the V-windshield. Therefore, the V-windshield panels 1 and 2 and the instrument panel 4 cooperate to form a corner in which is mounted the rear vision mirror generally designated 6.

The division pillar 3 comprises an outer molding 7 and an inner retainer strip 8, both of which extend vertically the full height of the panels 1 and 2, and also an outer rubber weatherstrip 9 and an inner rubber weatherstrip 10. The outer and inner members 7 and 8 are secured together by the screws 11 which also compress the weatherstrips 9 and 10 against the glass panels 1 and 2 to seal the gap between the adjacent vertical edges of the panels.

It is proposed to mount the rear view mirror 6 upon the division pillar 3 and to arrange the mirror for vertical adjustment. To this end a channel guide member 12, having a vertical slot 13 in its bottom 14, is provided with the inwardly turned flanges 15 along the edges of its side walls. The flanges 15 are arranged to be positioned between the inner retainer strip 8 and the weatherstrip 10 so that upon drawing the screws 11 tight the guide 12 will be securely held in position upon the division pillar 3. This can be achieved by first inserting the inner retainer strip 8 within the channel guide member 12 and then passing the screws through the retainer strip 8, weatherstrip 10, weatherstrip 9 and turning the same into the outer molding 7. The inside face of the bottom wall 14 of the guide member 12 is transversely serrated as at 16. A spring 17 of strip steel having curved outer ends 18 is mounted within the guide member 12 so that the outwardly turned ends 18 yieldably and slidably engage the retainer plate 8. The center portion of the spring 17 is flat and serrated as at 19. Thus the serrated spring 17 cooperates with the serrated bottom wall 14 of the channel guide to form a clutch for holding the mirror in adjusted position.

A ball member 20 having a stem 21 is riveted to the spring 17. The frame of the mirror 6 is provided with a socket 22 which cooperates with the ball 20 to form a ball and socket support for the mirror 6. A suitable spring 23 yieldably and frictionally holds the mirror 6 in whatever position it is adjusted.

The spring 17 is at all times under compression and thus yieldably holds the serrations 19 of the spring 17 in interengagement with the serrations 16 of the guide 12. When it is desired to adjust the mirror 6 either upwardly or downwardly, the mirror is pressed outwardly of the vehicle body or toward the windshield panels 1 and 2 against the tension of the spring 17 to disengage the serrations 19 and 16 which permits the mirror thereafter to be moved either upwardly or downwardly. As soon as outward pressure upon the mirror is removed, the spring 17 again expands and forces the serrated portion 19 into engagement with the serrated portion 16 to adjustably hold the mirror in position.

From the above description it will be seen that the rear view mirror 6 is adjustably mounted upon the windshield division pillar 3 and held in position by a clutch such as above described. However, the invention should not be construed as limited to the specific type of clutch shown as other suitable clutching arrangements can be used and among these is included the modified form of clutch shown in Figs. 5, 6 and 7. In this form of the invention the guide member 30 is provided with inwardly turned edges 31 which are clamped between the inside retainer strip 8 and the weather strip 10 in the same fashion as described in the principal form of the invention. However, the guide member 30 has a vertically extending slot 32 in which the stem 33 of the ball 34 moves during the up and down movement of the mirror. It is desirable that the stem 33 should not engage the sides of the slot 32 as the stem 33 travels in the slot 32. To this end a flat serrated clutch member 35 is mounted on the inner end of the stem 33 within the guide 30. A spring 36 is riveted to the clutch member 35 as at 37 and extends transversely of the guide 30. The spring 36, as shown in the sectional view, Fig. 5, is provided on each side of the rivet with a reverse curve and the outer edges 38 of the spring have but a very small clearance with the outer side walls of the guide 30 or, if desired, may even slidably engage the same.

The spring 36 is riveted centrally to the clutch member 35 so that it acts as a spacer and guide member for the stem 33 and retains the stem 33 at all times centered in the slot 32 so that during the travel of the stem 33 in the slot 32, the stem will not engage the sides of the slot 32. Thus, the guide member 30 and the stem 33 may be lacquered, enameled, plated, or otherwise ornamented and this ornamental finish will not be worn off along the sides of the slot 32 because the stem 33 is prevented by the spring 36 from engaging the sides of the slot. It will be noted that the edges of the guide member 30 adjacent the slot 32 are provided with the reverse bent portions 39, which are serrated transversely as at 40. The clutch member 35 is correspondingly serrated as at 41.

Hence, when it is desired to adjust the mirror 6 upwardly or downwardly the same can be accomplished by pressing the mirror outwardly toward the glass panels 1 and 2 whereupon the spring 36 yields sufficiently to permit the clutch member 35 to disengage the serrations 40 and thus permit vertical adjustment of the mirror. During vertical adjustment of the mirror, the spring 36 will slide along the retainer plate 8 which acts as a trackway. Upon release of this outward pressure the spring 36 again expands and urges the clutch member 35 outwardly into yielding interengagemment with the serrations 40, thus releasably holding the mirror in its adjusted position. In both forms of the invention the springs 17 and 36 are sufficiently strong so that the interengagement of the cooperating serrated clutch members hold the mirror in position against vibration incident to the motion of the vehicle.

In the form shown in Fig. 5 the mirror 6 comprises two mirror glasses 42 and 43 which are mounted at an angle to each other as shown. This arrangement of the mirror plates 42 and 43 permits the driver to have a greater rear view range.

Referring to Figs. 8 and 9, it will be noted that the mounting of this mirror in the corner between the two panels 1 and 2 and below the windshield header 45 places the mirror out of the way and in a position where it is much less apt to be struck by any portion of the body of the driver or front seat passenger. At the same time the mirror can be positioned sufficiently below the header 45 so that, as shown in Fig. 1, the driver can see out of the windshield above the mirror 6 and thus obviate a blind spot. In fact, the adjustment of the mirror on the division pillar permits each individual driver, regardless of his size, to position the mirror so that he can obtain the best possible rear view and at the same time not obstruct, or offer the least possible obstruction to, his forward view out of the V windshield panels 1 and 2. As shown in Fig. 8, the present trend toward inclined rear windows 60 appreciably limits the rear view of the driver but this can be overcome by lowering the mirror along its guide to some such position as shown which assures both tall and short drivers a good rear view.

In the form shown in Figs. 10 and 11, a spacer strip 50 is mounted between the weatherstrip 10 and the retainer strip 8, preferably throughout its length, so that the spacer strip is spaced slightly from the inside faces of the windshield panels 1 and 2. In this form of the device the retainer 8 serves as a track for a sliding plate 51 of channel section and having inwardly turned lips 52 which overlap and slidably engage the under face of the retainer 8 to retain the slide 51 on the retainer strip 8. A spring 53 is housed within the slide 51. The pin 33 which carries the ball 34 passes through a circular opening 54 in the slide 51 and is riveted to the spring as at 55. The mirror is attached to the ball 34 in the same manner as described for the principal form of the invention.

In this modified form, shown in Figs. 10 and 11, when it is desired to either raise or lower the mirror the same can be accomplished by merely grasping the mirror and sliding it either up or down. At this time the slide plate 51, as well as the ends of the spring 53, slide along the retainer strip 8. The spring 53 yieldably engages the retainer strip 8 and the outward thrust of this spring causes the flanges 52 of the slide 51 to frictionally engage the retainer strip 8 with sufficient friction to hold the mirror in any of its adjusted positions.

I claim:

1. In an automotive vehicle having a V windshield, a track positioned vertically aong the apex of the said V windshield, a slide member slidable along the said track, a fixed cover member for the slide including a vertical slot for concealing the said track member, a mirror, means passing through the said slot for securing the said mirror upon the said slide member, and cooperating clutch members mounted within, and concealed by, the said cover plate, one clutch member carried by the slide and the other by the cover plate, for holding the mirror in any of its vertically adjusted positions, said clutch members being releasable to permit adjustment of said mirror.

2. In an automotive vehicle having a V windshield, a track positioned vertically along the apex of the said V windshield, a slide member slidable along the said track, a cover member for said slide having a vertical slot and fixed to said track for concealing the said track member, a mirror, a stem passing through the said slot for securing the said mirror upon the said slide member, and cooperating clutch members, one clutch member carried by the slide and the other by the cover plate, mounted within, and concealed by, the said cover plate for holding the mirror in any of its vertically adjusted positions, said clutch members being disengageable to permit adjustment of said mirror.

3. In an automotive vehicle having a V windshield, a track positioned vertically along the apex of the said V windshield, a slide member slidable along the said track, a fixed cover member for the slide having a vertical slot for concealing the said track member, a mirror, a stem passing through, and clearing the edges of, the said slot for securing the said mirror upon the said slide member, and cooperating clutch members mounted within, and concealed by, the said cover plate, one clutch member carried by the slide and the other by the cover plate, for holding the mirror in any of its vertically adjusted positions, said clutch members being releasable to permit adjustment of said mirror, the said slide member being slidably guided upon the said track within the cover plate and arranged to retain the stem member at all times clear of the edges of the said slot.

4. In an automotive vehicle having a V windshield, a track positioned vertically along the apex of the said V windshield, a slide member slidable along the said track, a fixed cover member for the slide having a vertical slot for concealing the said track member, a mirror, a stem passing through, and clearing the edges of, the said slot for securing the said mirror upon the said slide member, and cooperating clutch members mounted within, and concealed by, the said cover plate, one clutch member carried by the slide and the other by the cover plate, for holding the mirror in any of its vertically adjusted positions, said clutch members being releasable to permit adjustment of said mirror, the said sliding member slidably engaging the side walls of the channel cover during the adjustment of the slide along the track whereby the mirror support stem is guided between, and always held clear of, the side edges of the slot.

PORTER E. STONE.